(12) United States Patent
Sugimoto et al.

(10) Patent No.: US 12,185,251 B2
(45) Date of Patent: Dec. 31, 2024

(54) WIRELESS COMMUNICATION DEVICE AND WIRELESS COMMUNICATION SYSTEM

(71) Applicant: RENESAS ELECTRONICS CORPORATION, Tokyo (JP)

(72) Inventors: Hiroki Sugimoto, Tokyo (JP); Kenji Ogami, Tokyo (JP)

(73) Assignee: RENESAS ELECTRONICS CORPORATION, Tokyo (JP)

(*) Notice: Subject to any disclaimer, the term of this patent is extended or adjusted under 35 U.S.C. 154(b) by 399 days.

(21) Appl. No.: 17/748,716

(22) Filed: May 19, 2022

(65) Prior Publication Data

US 2022/0386239 A1 Dec. 1, 2022

(30) Foreign Application Priority Data

May 28, 2021 (JP) ................................. 2021-089908

(51) Int. Cl.
*H04W 52/02* (2009.01)
*H04W 52/36* (2009.01)

(52) U.S. Cl.
CPC ... *H04W 52/0235* (2013.01); *H04W 52/0245* (2013.01); *H04W 52/365* (2013.01)

(58) Field of Classification Search
CPC ............. H04W 52/02; H04W 52/0235; H04W 52/0245; H04W 52/365; H04W 52/36
See application file for complete search history.

(56) References Cited

U.S. PATENT DOCUMENTS

| | | | | |
|---|---|---|---|---|
| 5,937,207 A | * | 8/1999 | Ito | G03B 17/245 396/6 |
| 7,236,060 B2 | * | 6/2007 | Wood | H03B 5/1852 327/292 |
| 7,596,153 B2 | * | 9/2009 | Paulitsch | H04J 3/0685 370/503 |
| 8,633,774 B2 | * | 1/2014 | Wood | H03B 5/1852 327/292 |
| 8,878,583 B2 | * | 11/2014 | Senda | H03K 3/017 327/131 |
| 9,977,930 B2 | * | 5/2018 | Hines | G06K 7/10069 |

(Continued)

FOREIGN PATENT DOCUMENTS

JP 2020-195062 A 12/2020

*Primary Examiner* — Hai V Nguyen
(74) *Attorney, Agent, or Firm* — Rimon P.C.

(57) ABSTRACT

An active period that is expressed by a range of a count value t[x] and is a period during which communication of a packet with an outside is permitted and an inactive period that is expressed by a range of the count value t[x] and is a period during which communication of a packet with an outside is prohibited are defined in schedule data. A wireless communication interface communicates a packet with the outside during the active period. A power supply controller cuts off power supplied to the wireless communication interface during the inactive period. A synchronous controller updates a count value of a counter based on a synchronous data value in the received packet during a reception operation of the packet, define the synchronous data value based on the updated count value t[y] during a transmission operation of the packet, and store it in the packet to be transmitted.

20 Claims, 13 Drawing Sheets

(56) References Cited

U.S. PATENT DOCUMENTS

| | | | | |
|---|---|---|---|---|
| 10,123,367 | B2* | 11/2018 | Arvidson | H04W 74/08 |
| 10,848,945 | B2* | 11/2020 | Choi | H04L 65/40 |
| 11,272,348 | B2* | 3/2022 | Higuchi | H04W 76/14 |
| 2007/0147436 | A1* | 6/2007 | Zumsteg | H04L 7/046 |
| | | | | 370/509 |
| 2008/0089363 | A1* | 4/2008 | Paulitsch | H04J 3/0685 |
| | | | | 370/503 |
| 2012/0133445 | A1* | 5/2012 | Wood | H03B 5/1852 |
| | | | | 331/45 |
| 2014/0355628 | A1* | 12/2014 | Akhlaq | H04W 56/001 |
| | | | | 370/509 |
| 2016/0165509 | A1* | 6/2016 | Jiang | H04W 40/00 |
| | | | | 370/331 |
| 2016/0374123 | A1* | 12/2016 | Arvidson | H04W 8/005 |
| 2017/0116442 | A1* | 4/2017 | Hines | G01R 15/181 |
| 2017/0330278 | A1* | 11/2017 | Radulescu | H04J 3/0641 |
| 2019/0141620 | A1* | 5/2019 | Pujari | H04W 48/16 |
| 2020/0382937 | A1* | 12/2020 | Higuchi | H04W 76/40 |
| 2022/0386239 | A1* | 12/2022 | Sugimoto | H04W 52/0235 |

* cited by examiner

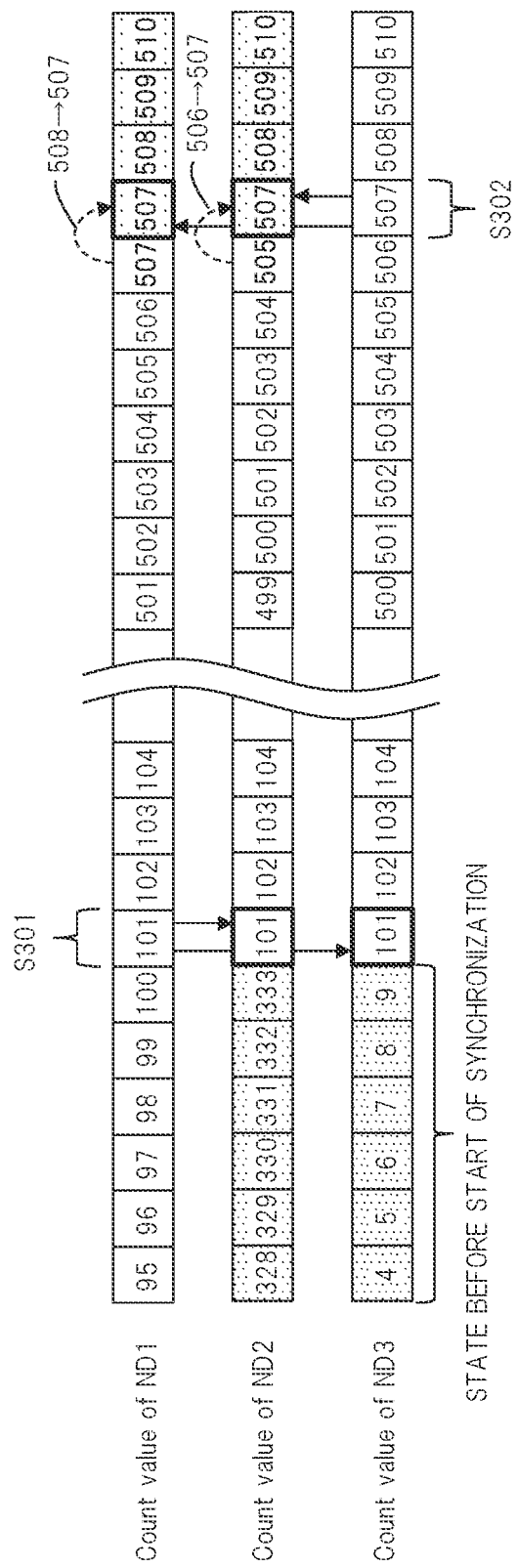

WIRELESS COMMUNICATION DEVICE AND WIRELESS COMMUNICATION SYSTEM

CROSS-REFERENCE TO RELATED APPLICATIONS

The disclosure of Japanese Patent Application No. 2021-089908 filed on May 28, 2021 including the specification, drawings and abstract incorporated herein by reference in its entirety.

BACKGROUND

The present invention relates to a wireless communication device and wireless communication system.

Patent Document 1 discloses a technique for covering a wider communication range with a small number of channels in a wireless communication device corresponding to "Bluetooth (registered trademark) mesh" standard. Specifically, the wireless communication device includes an advertised communication control unit that executes broadcast communication with a plurality of unspecified other devices, and a connection communication control unit that executes one-to-one communication with a specific other device. The connection communication control unit is used to send and receive messages to and from other devices in a connection cluster that can be communicated by a wireless connection communication control unit. On the other hand, the advertised communication control unit of a device permitted in the connection cluster is used to send and receive messages to and from other devices outside the connection cluster.

There are disclosed techniques listed below. [Patent Document 1] Japanese Unexamined Patent Application Publication No. 2020-195062

SUMMARY

For example, a wireless communication device and a wireless communication system corresponding to the "Bluetooth mesh" (abbreviated as BT mesh in the specification) standard as described in Patent Document 1 are known. The BT mesh standard is a mesh network standard established by the Bluetooth SIG (Special Interest Group). In the BT mesh standard, a basic operation is to communicate packets, in other words, messages by using asynchronous flooding, in other words, broadcast. The wireless communication device that constitutes the BT mesh is called a node.

Here, in the BT mesh, for example, some nodes can be defined as low power nodes having no relay function, that is, a packet relay function. Since the low power node can determine a packet reception period by its own node, it may be in a sleep state during the period other than this reception period. On the other hand, since each node except the low power node receives packets generated asynchronously, it is necessary to always wait in a state where a packet can be received. For this reason, in the BT mesh, the power consumption of the entire network may increase.

The other object and new feature will become apparent from description of the present specification and the accompanying drawings.

A wireless communication device according to one embodiment includes an oscillator configured to generate a clock signal, a counter configured to sequentially update a count value in accordance with the clock signal, a memory, a wireless communication interface, a power supply controller, and a synchronous controller. The memory is configured to hold schedule data that define an active period and an inactive period, the active period being expressed by a range of the count value and being a period during which communication of a packet with an outside is permitted, the inactive period being expressed by a range of the count value and being a period during which communication of a packet with an outside is prohibited. The wireless communication interface is configured to communicate a packet with the outside during the active period obtained from the schedule data and the count value of the counter. The power supply controller is configured to cut off power supplied to the wireless communication interface during the inactive period obtained from the schedule data and the count value of the counter. The synchronous controller is configured to update the count value of the counter on a basis of a synchronous data value stored in a received packet during a reception operation of receiving the packet from the outside, define the synchronous data value on a basis of the updated count value during a transmission operation of transmitting a packet to the outside, and store the defined synchronous data value in the packet to be transmitted.

According to one embodiment, it becomes possible to reduce the power consumption in a wireless communication device and a wireless communication system.

BRIEF DESCRIPTION OF THE DRAWINGS

FIG. 10 is a timing chart illustrating an operation example of a synchronization method using a count value in the wireless communication system according to the first embodiment.

DETAILED DESCRIPTION

Figure 1:
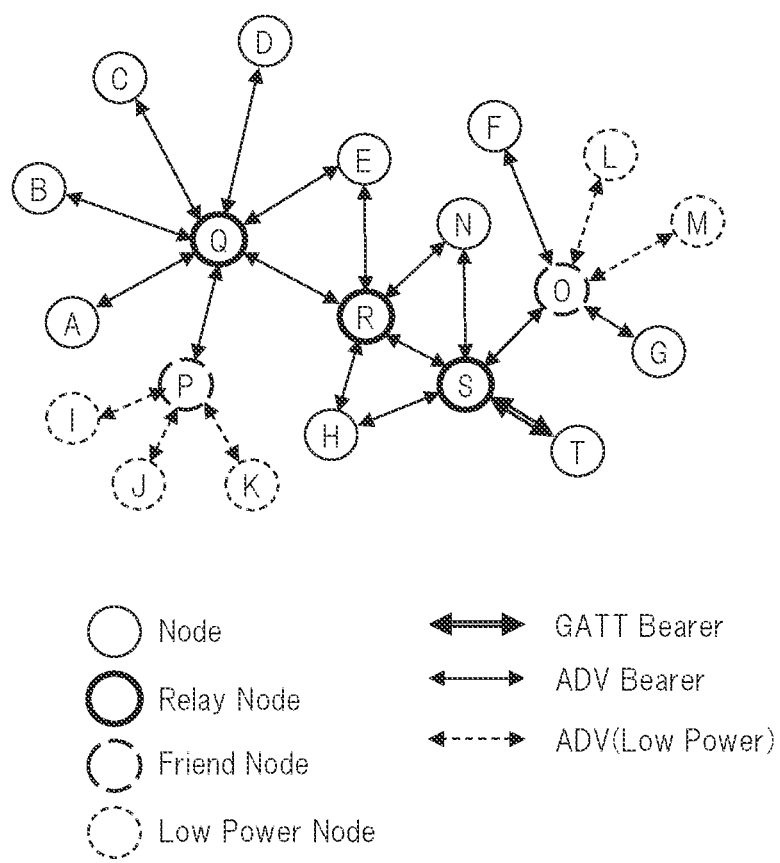
FIG. 1 is a schematic view illustrating a configuration example of a wireless communication system according to a first embodiment.

In embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof. Further, in the embodiments described below, in a case of referring to the number of elements (including number of pieces, values, amount, range, and the like), the number of the elements is not limited to a specific number unless otherwise stated or except the case where the number is apparently limited to a specific number in principle, and the number larger or smaller than the specified number may also be applicable.

Moreover, in the embodiments described below, it goes without saying that the components (including element steps and the like) are not always indispensable unless otherwise stated or except the case where the components are apparently indispensable in principle. Similarly, in the embodiments described below, when the shape of the components, positional relation thereof, and the like are mentioned, the substantially approximate and similar shapes and the like are included therein unless otherwise stated or except the case where it is conceivable that they are apparently excluded in principle. The same goes for the numerical value and the range described above.

Hereinafter, embodiments of the present invention will be described with reference to the drawings. Note that in all of the drawings for explaining the embodiments, in principle, the same reference numeral is assigned to the same member, and repeated explanation thereof will be omitted.

First Embodiment

<Outline of Wireless Communication System>

FIG. 1 is a schematic view illustrating a configuration example of a wireless communication system according to a first embodiment. FIG. 1 illustrates a network configuration example of a BT mesh as one embodiment of the wireless communication system. In the BT mesh, it possible to extend a communication distance by sequentially relaying received packets by flooding. FIG. 1 illustrates a plurality of nodes A to T. Each of the nodes A to T is a wireless communication device corresponding to the BT mesh standard.

The nodes A to T include normal nodes A to H, N, and T, relay nodes Q, R, and S, friend nodes O and P, and low power nodes I to M. Each of the normal nodes A to H has a function of generating a packet including a predetermined destination and transmitting the generated packet, and a function of receiving a packet destined for its own node. Each of the relay nodes Q, R, and S has a function of transmitting the received packet to a plurality of other nodes by flooding.

Each of the friend node O and P has a function of temporarily holding a packet destined for the low power nodes I to M. Each of the low power node I to M intermittently inquires of the friend nodes O and whether they hold a packet destined for their own node or not. If they hold the packet, each of the low power node I to M receives the packet from the friend node O and P. For this reason, the low power node I to M become an active state when making an inquiry, and may become an inactive state, in other words, a sleep state during other periods. The active state is an operating state with normal power consumption, and the sleep state is an operating state with power saving.

As a specific operation example in FIG. 1, for example, the normal node T generates a packet destined for the low power node L, and transmits the packet to the relay node S by using communication means called a GATT bearer. The GATT bearer is one-to-one communication means. The relay node S relays the packet from the normal node T by flooding using communication means called an ADV bearer. The ADV bearer is one-to-many communication means. The friend node O receives and holds the packet destined for the low power node L and relayed by the relay node S. Then, the friend node O transmits the held packet to the low power node L in response to the inquiry from the low power node L.

In such a wireless communication system, the normal nodes A to H, N, and T, the relay nodes Q, R, and S, and the friend node O and P excluding the low power node I to M usually receive packets generated asynchronously. Therefore, is necessary to always wait in a state where the packet can be received. As a result, the power consumption of the entire network may increase. Therefore, it is beneficial to use a communication method of the embodiments described later.

<Outline of Communication System>

Figure 2:
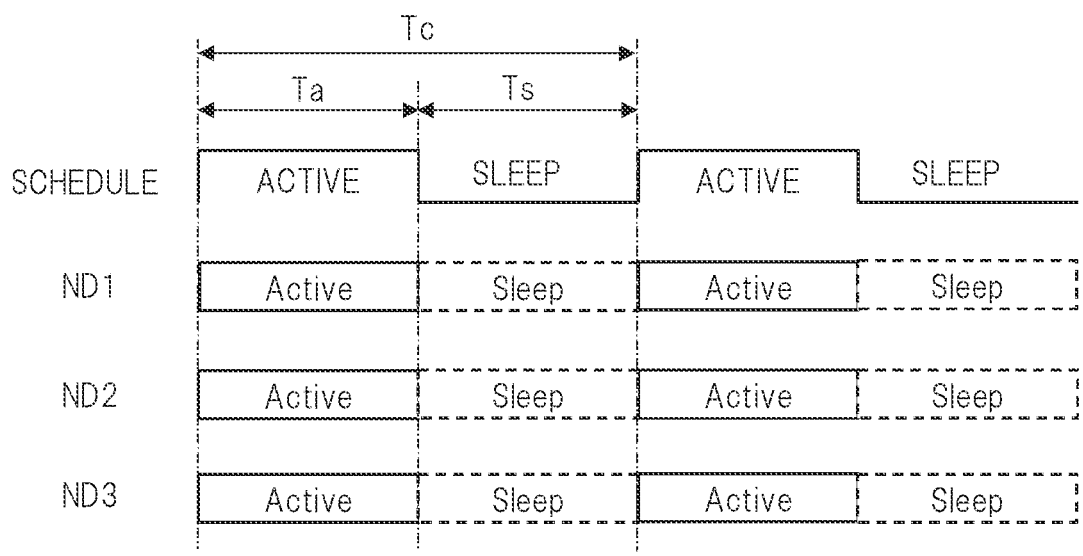
FIG. 2 is a schematic diagram for explaining one embodiment a communication system used by the wireless communication system according to the first embodiment.

FIG. 2 is a schematic diagram for explaining one embodiment of a communication system used in the wireless communication system according to the first embodiment. In the wireless communication system according to the first embodiment, as illustrated in FIG. 2, all wireless communication devices (nodes) ND1 to ND3 participating in a network operate in synchronization with a common schedule defined in advance. In the example of the schedule of FIG. 2, a cycle Tc that occurs repeatedly includes an active period Ta and a sleep period (inactive period) Ts.

The plurality of wireless communication devices ND1 to ND3 executes packet communication, that is, transmission reception at arbitrary timing within the active period Ta together. Further, the plurality of wireless communication devices ND1 to ND3 waits for reception of a packet during a period during which any packet is not transmitted within the active period Ta together. On the other hand, the plurality of wireless communication devices ND1 to ND3 operates in a predetermined power saving mode without executing packet communication during the sleep period Ts together. Note that in the specification, the plurality of wireless communication devices (nodes) ND1 to ND3 is collectively referred to as wireless communication devices (nodes) ND.

Since they operate in synchronization with the common schedule in this manner, the plurality of wireless communication devices ND1 to ND3 synchronizes a time. Specifically, each of the plurality of wireless communication devices ND1 to ND3 manages the time by a count value of a counter provided in the own device, for example. In this case, the plurality of wireless communication devices ND1 to ND3 may synchronize the count value appropriately. Further, in a case where the count value is used, the active period Ta is expressed by a range of the count value, and is a period during which communication of a packet with the outside permitted. On the other hand, the sleep period Ts expressed by a range of the count value, and is a period during which communication of a packet with the outside is prohibited.

Figure 3:
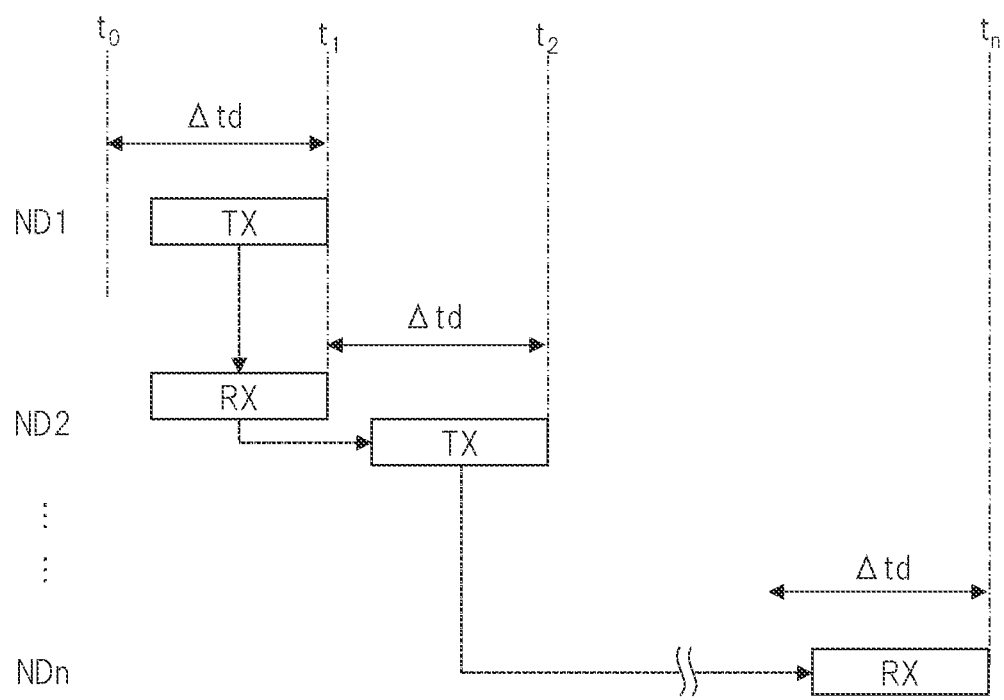
FIG. 3 is a view for explaining one embodiment of a method of synchronizing a time used by the communication system illustrated in FIG. 2.

FIG. 3 is a view for explaining one embodiment of a method of synchronizing the time used in the communication system of FIG. 2. Each of the wireless communication devices ND stores a count value, which is time information, in a packet to be transmitted to the other wireless communication device ND in order to synchronize the time with the other wireless communication device ND. On the other hand, the other wireless communication device ND that has received the packet updates the count value of the counter of its own device on the basis of the count value stored in the received packet.

In the example of FIG. 3, when the wireless communication device ND1 that starts communication prepares a packet to be transmitted, the wireless communication device ND1 stores the count value of its own device in a packet (TX), and transmits the packet (TX). Subsequently, the wireless communication device ND2 that relays the packet receives a packet (RX) from the wireless communication device ND1, and updates the count value of its own device with the count value stored in the received packet. This makes it possible to synchronize the count value, in other words, the time between the wireless communication device ND1 and the wireless communication device ND2.

Specifically, for example, the wireless communication device ND1 prepares a packet at a time $t_0$, passes a delay time $\Delta td$, and then completes transmission of the packet at a time $t_1$. The delay time $\Delta td$ is a delay time required for this transmission process of the packet, and is a time from the time when preparation of the packet is started to the time when transmission of the packet is completed, for example. On the other hand, the wireless communication device ND2 completes reception of the packet at the time $t_1$, and synchronizes the count value at the time. Therefore, the ideal count value stored in the packet from the wireless communication device ND1 is a count value at the time $t_1$.

Here, if the wireless communication device ND1 stores the count value at the time $t_0$, which is the time when the packet is prepared, in the packet, an error of the delay time $\Delta td$ may occur with respect to the time which is the ideal value. Thus, it is desirable that the wireless communication device ND1 defines this delay time $\Delta td$ as a predicted delay time in advance, for example, and stores a count value to which the predicted delay time is reflected at the time $t_0$, that is, a count value closer to the time $t_1$ in the packet. However, in a case where the delay time $\Delta td$ is sufficiently short, it is not always necessary to reflect the predicted delay time.

The wireless communication device ND2 updates the count value of its own device on the basis of the count value stored in the packet (RX) from the wireless communication device ND1, and then transmits the packet to another wireless communication device (for example, ND3). Also at this time, the similar delay time $\Delta td$ to a case of the wireless communication device ND1 may occur. Therefore, in a case where the delay time $\Delta td$ becomes a problem, it is desirable that the wireless communication device ND2 reflects the predicted delay time in the updated count value as in a case of the wireless communication device ND1, and stores the count value to which the predicted delay time is reflected, that is, the count value closer to the time $t_2$ in the packet (TX) to be transmitted. Namely, it is desirable that the wireless communication device ND2 rewrites the count value stored in the packet from the wireless communication device ND1.

In the similar manner thereafter, the time is synchronized between the transmitting device and the receiving device each time the packet is relayed to the subsequent device. As a result, it becomes possible to execute communication control based on the active period Ta and the sleep period Ts as illustrated in FIG. 2 with high accuracy. Namely, by preventing packet loss or the like due to synchronization deviation, it becomes possible to improve communication reliability and reduce power consumption by the sleep period Ts. Note that here, for example, the wireless communication device ND1 transmits the count value corresponding to the time $t_1$. However, alternatively, the wireless communication device ND2 can receive the count value at the time to from the wireless communication device ND1, and predict the count value corresponding to the time $t_1$.

<Outline of Wireless Communication Device>

Figure 4:
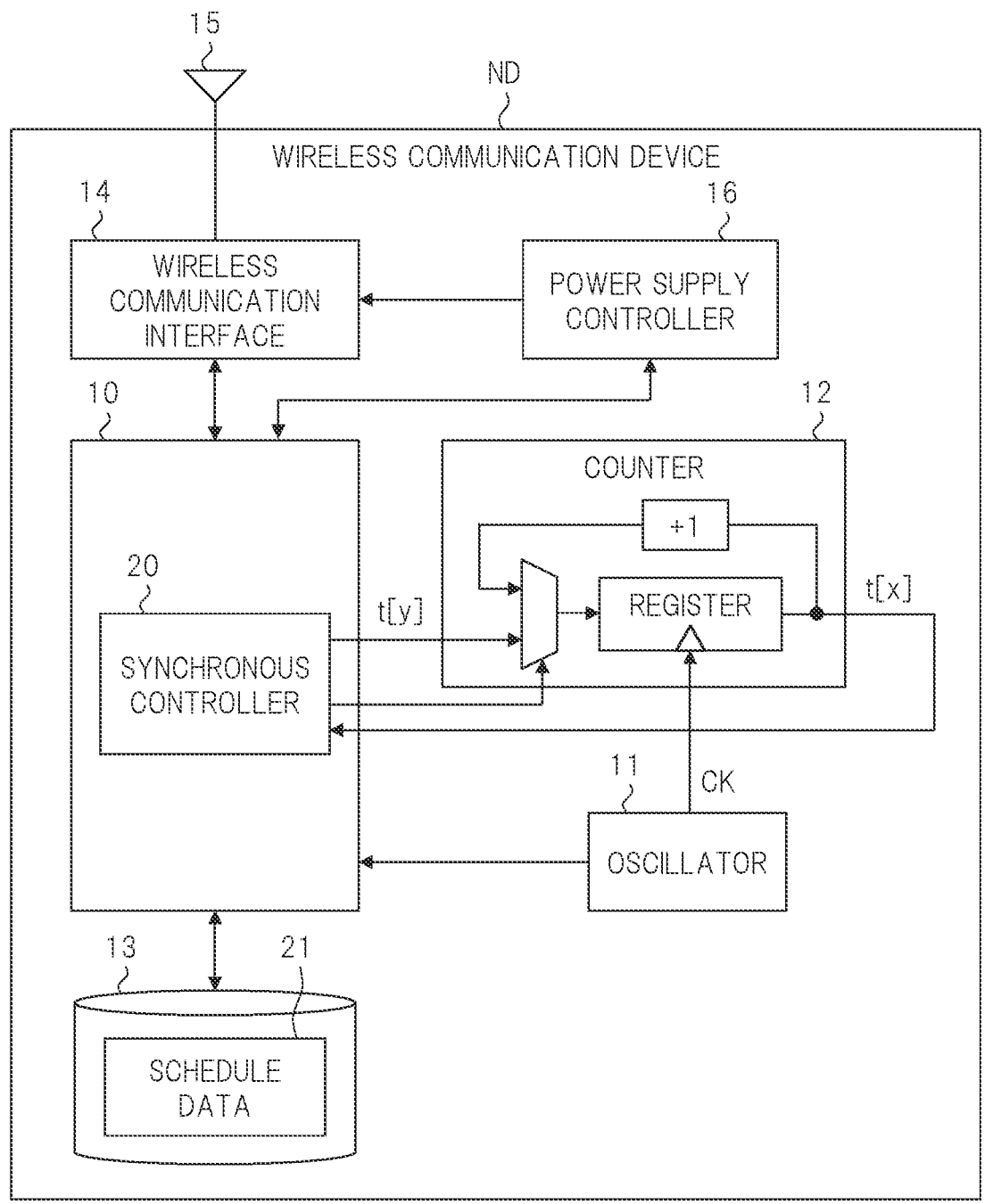
FIG. 4 is a schematic view illustrating a configuration example of a wireless communication device according to the first embodiment of the present invention.

FIG. 4 is a schematic view illustrating a configuration example of a wireless communication device according to the first embodiment of the present invention. A wireless communication device ND illustrated in FIG. 4 includes an arithmetic processing unit 10, an oscillator 11, a counter 12, a memory 13, a wireless communication interface 14, an antenna 15, and a power supply controller 16. The arithmetic processing unit 10 is typically realized by a processor or the like that executes a program held in the memory 13. However, the arithmetic processing unit 10 may be realized by an ASIC (Application Specific Integrated Circuit) or an FPGA (Field Programmable Gate Array). The arithmetic processing unit 10 executes predetermined processing according to the role of the wireless communication device ND, in addition to, for example, transmission/reception control of a packet, base bend processing for a packet, and the like.

The oscillator 11 is composed of a PLL (Phase Locked Loop) circuit or the like, for example, and generates a clock signal CK. The counter 12 sequentially updates a count value $t[x]$ in accordance with the clock signal CR from the oscillator 11. The counter 12 can update the count value $t[x]$ held in a register or the like with a count value $t[y]$ from the arithmetic processing unit 10. The memory is composed of a combination of a RAM (Random Access Memory) and a non-volatile memory, for example. The memory 13 holds schedule data 21 in which the active period Ta and the sleep period (inactive period) Ts are defined as illustrated in FIG. 2.

The wireless communication 14 is composed of an RFIC (Radio Frequency Integrated Circuit) or the like, and executes wireless communication via the antenna 15. The wireless communication interface 14 communicates a packet with the outside, that is, transmits or receives a packet in the active period Ta obtained from the schedule data 21 and the count value $t[x]$ of the counter 12. Specifically, for example, the arithmetic processing unit 10 determines the active period Ta on the basis of the schedule data 21 and the count value $t[x]$, and communicates the packet via the wireless communication interface 14 in this period.

The power supply controller 16 is composed of a power management IC or the like, for example, and manages power supply of the entire wireless communication device ND. As one of them, the power supply controller 16 cuts off the power supplied to the wireless communication interface 14 in the sleep period Ts obtained from the schedule data 21 and the count value $t[x]$. Specifically, for example, the arithmetic processing unit 10 may determine the sleep period Ts on the basis of the schedule data 21 and the count value $t[x]$, and indicate this period to the power supply controller 16. This makes it possible to reduce the power consumption of the wireless communication interface 14, which is a unit that consumes a particularly large amount of power.

Here, the arithmetic processing unit 10 has a synchronous controller 20. In a case where the synchronous controller 20 operates as a relay for transmitting a packet received from the outside to the outside, for example, like the wireless communication device ND2 in FIG. 3, the synchronous controller 20 executes the following processing. Namely, the synchronous controller 20 determines a synchronous data value stored in the received packet, here, a count value t[y] to be updated on the basis of the count value, during a reception operation of receiving the packet from the outside, and updates the count value t[x] of the counter 12 with the count value t[y]. Then, the synchronous controller 20 determines a synchronous data value on the basis of the updated count value t[y] during a transmission operation of transmitting the packet to the outside, and stores the determined synchronous data value in the packet to be transmitted.

Further, in a case where the synchronous controller 20 operates as a target for receiving a packet destined to its own device from the outside, the synchronous controller 20 executes only the processing during the reception operation described above. On the other hand, in a case where the synchronous controller operates as an initiator for transmitting a packet generated by its own device to the outside, for example, as in the wireless communication device ND1 of FIG. 3, the synchronous controller 20 executes the following processing. Namely, during the transmission operation, the synchronous controller 20 determines a synchronous data value on the basis of the count value t[x] of the counter 12 of its own device, and stores the determined synchronous data value in the packet to be transmitted.

Note that the wireless communication device ND illustrated in FIG. 4 is particularly useful when applied to each node in the wireless communication system of the BT mesh illustrated in FIG. 1. However, the application destination of the wireless communication device ND is not limited to the BT mesh, and may another wireless communication system, in other words, a wireless communication network. In this case, in particular, from the viewpoint of time synchronization, the application destination may be a network using a flooding method. Further, although the specification is premised on application to a wireless communication network, the communication system according to the first embodiment can be applied to a wired communication network in some cases.

<Details of Communication System>
[Role of Node on Network]

Figure 5:
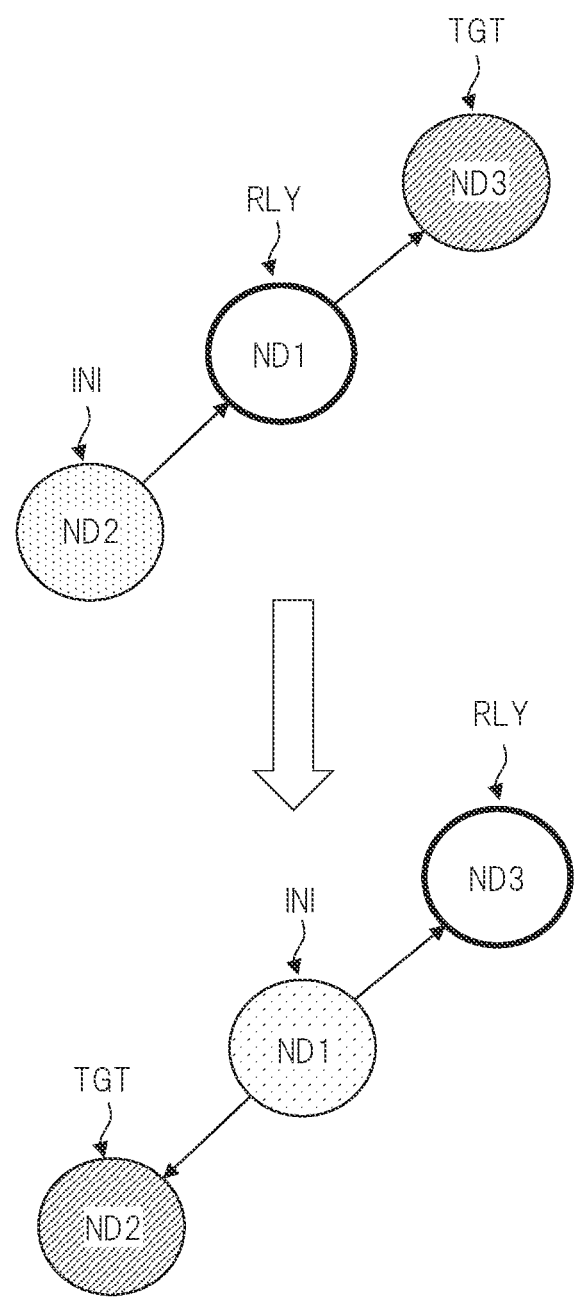
FIG. 5 is a view for explaining one embodiment of a role played by the wireless communication device illustrated in FIG. 4 on a network.

FIG. 5 is a view for explaining one embodiment of a role played by the wireless communication device illustrated in FIG. 4 on a network. In FIG. 5, each of a plurality of wireless communication devices (nodes) ND1 to ND3 plays any one role of an initiator INI, a relay RLY, or a target TGT. The initiator INI plays a role as a starting point of communication. The relay RLY plays a role of relaying a packet. The target TGT plays a role as an end point of communication.

The role of each node ND on the network is not fixed and can be changed as appropriate. In the example of FIG. 5, the nodes ND1, ND2, and ND3 respectively play roles of the relay RLY, the initiator INI, and the target TGT in an active period Ta. On the other hand, when the roles are changed in a predetermined active period Ta, the nodes ND1, ND2, and ND3 respectively play roles of the initiator INI, the target TGT, and the relay RLY in the subsequent active period Ta.

[Setting Method of Schedule Data]

As a method of setting the common schedule data 21 illustrated in FIGS. 2 and 4 in the plurality of nodes ND, for example, the following method can be mentioned. As a first method, there is a method in which a system administrator stores the common schedule data 21 in the memory 13 of the plurality of nodes ND in advance. As a second method, there is a method in which a provisioner notifies a target node ND of the schedule data 21 when executing a procedure called provisioning for causing the target node ND to participate in a BT mesh.

As a third method, there is a method of dynamically changing and sharing the common schedule data 21 in the entire BT mesh on the basis of a predetermined procedure. Specifically, there is a method in which a node ND that wants to change the schedule data 21 transmits the changed common schedule data 21 to another node ND using the BT mesh. Note that the first to third methods can also be used in combination as appropriate.

[Details of Schedule Data]

Figure 6:
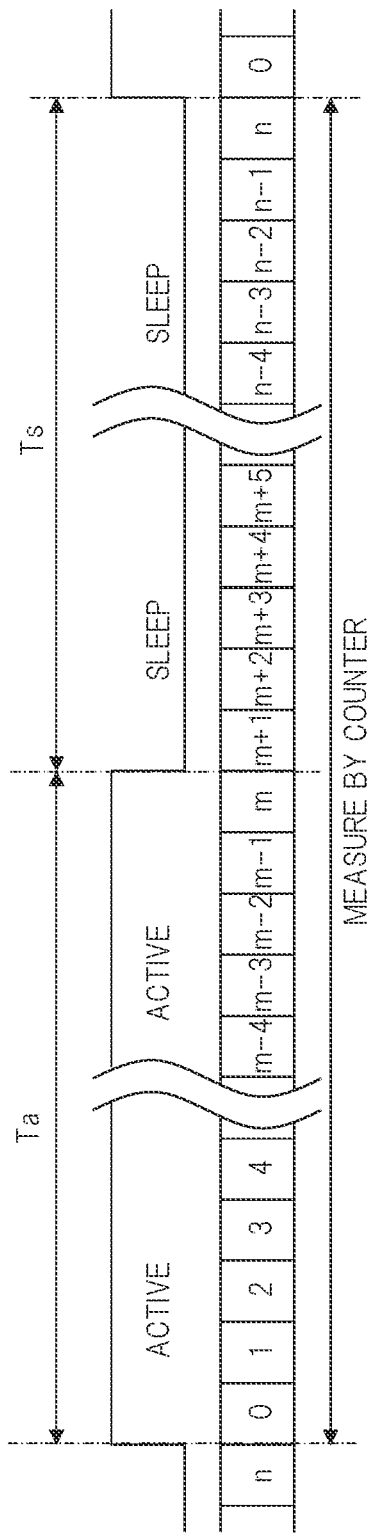
FIG. 6 is a timing chart for explaining one detailed embodiment of schedule data in the wireless communication system according to the first embodiment.

FIG. 6 is a timing chart for explaining one detailed embodiment of schedule data in the wireless communication system according to the first embodiment. As described above, in the schedule data 21, the active period Ta and the sleep period (inactive period) Is are determined by the count value. In the example of FIG. 6, the counter 12 cyclically increments the count value t[x] in a range of 0 to n by +1 in accordance with the clock signal CK. Then, in the schedule data 21, the active period Ta is defined in a range of the count value t[x] of 0 to m, and the sleep period Ts is defined in a range of the count value t[x] of "m+1" to n. In this case, the schedule data 21 can be appropriately changed depending on the value of m and the value of n.

Each node ND determines the active period Ta and the sleep period Ts on the basis of the schedule data and the count value t[x] of the counter 12. Then, each node ND communicates the packet during the active period Ta. On the other hand, each node ND does not execute packet communication during the sleep period Ts, and operates in a power saving mode by cutting off the power supplied to the wireless communication interface 14.

[Operation of initial Synchronization]

Figure 7:
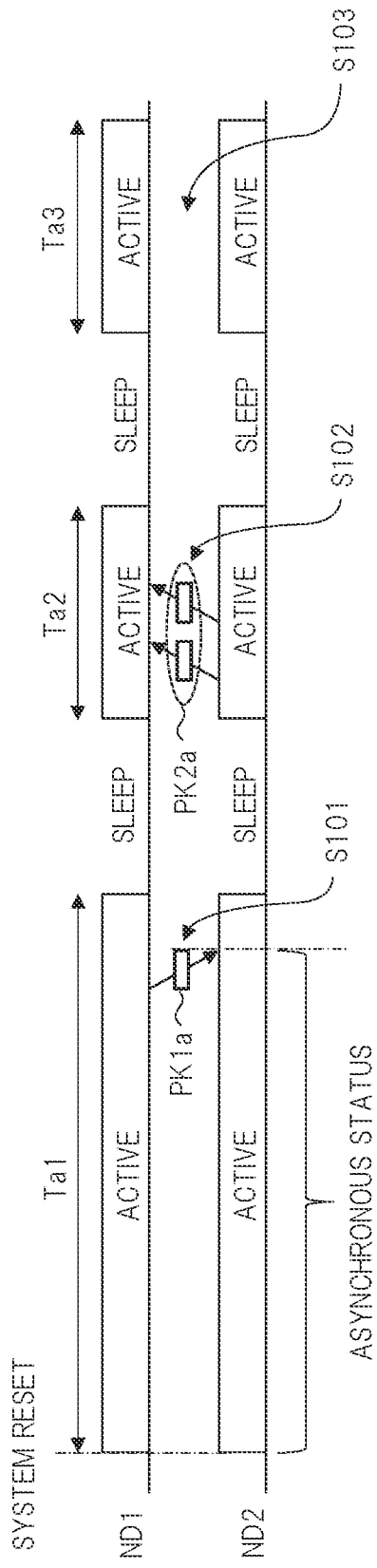
FIG. 7 is a timing chart for explaining an operation example associated with initial synchronization in the wireless communication system according to the first embodiment.

FIG. 7 is a timing chart for explaining an operation example associated with initial synchronization in the wireless communication system according to the first embodiment. In FIG. 7, all nodes ND1 and ND2 operate in an active period Ta1 after system reset. In the active period Ta1, the transmitting node ND1 transmits a first packet PK1a, and the receiving node ND2 receives the first packet PK1a, thereby establishing synchronization between the node ND1 and the node ND2 (Step S101).

All the nodes ND1 and ND2 can communicate a packet PK2a at arbitrary timing in an active period Ta2 after establishing the synchronization (Step S102). Further, in each active period after establishing the synchronization, it is not always necessary for packet communication to be executed, and there may be an active period Ta3 in which packet communication is not executed (Step S103).

[Maintenance of Synchronization]

Figure 8:
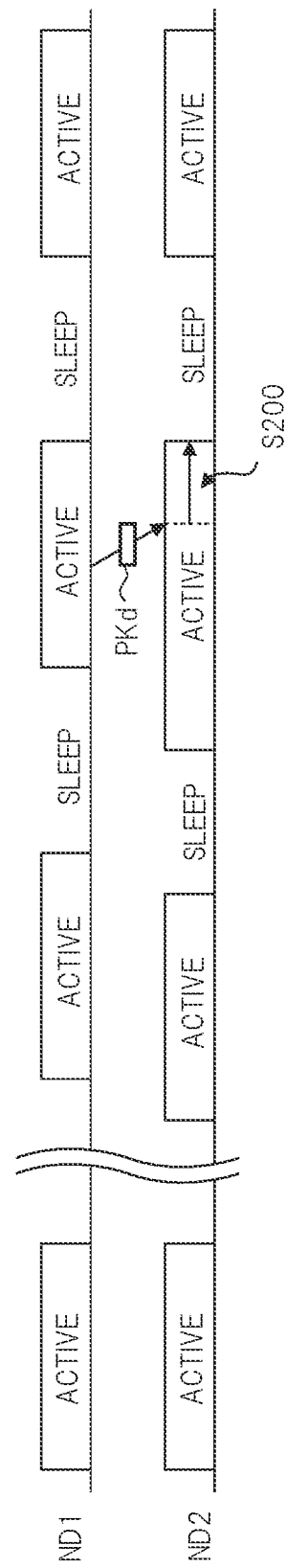
FIG. 8 is a timing chart for explaining an operation example associated with maintenance of synchronization in the wireless communication system according to the first embodiment.

FIG. 8 is a timing chart for explaining an operation example associated with maintenance of synchronization in the wireless communication system according to the first embodiment. For example, since the clock signal CK from the oscillator 11 in FIG. 4 has a deviation for each node ND, a synchronization shift, that is, a shift of the count value t[x] may occur if packet transmission/reception is not executed for a long time. Then, if this synchronization deviation becomes excessive, normal packet communication between the nodes ND may become difficult.

Therefore, it is desirable to set the maximum transmission interval or the like in the initiator INI or the like described in FIG. 5, for example. In a case where no packet to be transmitted exists, the node ND1 serving as the initiator INI transmits a dummy packet PKd or the like so as not to exceed the maximum transmission transmit interval, for example (Step S200). By periodically reestablishing synchronization in this manner, each of the nodes ND1 and ND2 can maintain the synchronization.

[Format of Packet]

Figure 9:
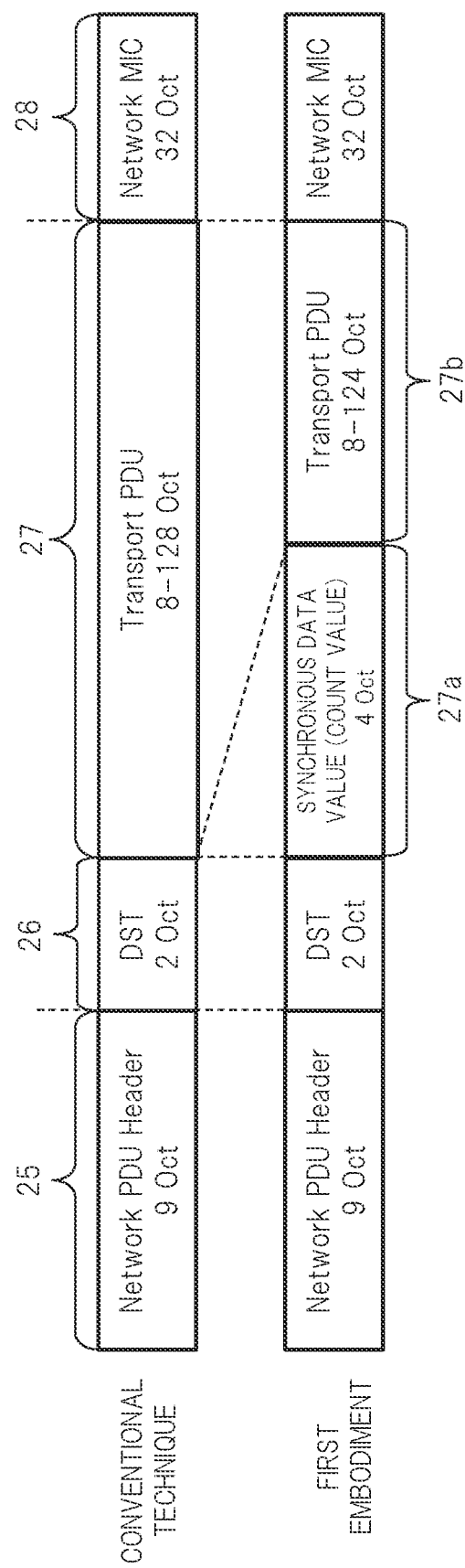
FIG. 9 is a schematic view illustrating an example of a packet format in the wireless communication system according to the first embodiment.

FIG. 9 is a schematic view illustrating one embodiment of a packet format in the wireless communication system according to the first embodiment. A conventional packet used in the BT mesh standard, in other words, a message includes a header field including a source address, a destination address (DST) field 26, a "Transport PDU (Protocol Data Unit)" field 27, and an MIC (Message Integrity Check) field 28.

In the FT mesh standard, a "Upper Transport Access PDU" encrypted in an "Upper Transport" layer is divided so as to fall into one packet in a "Lower Transport" layer, and the divided PDU becomes a "Transport PDU". The "Transport PDU" is encrypted in a "Network" layer together with a destination address (DST). The MIC field 28 is a field for checking whether the PDU is correctly encrypted or not.

Here, the packet used in the first embodiment uses the conventional packet format as is, and a field 27a for storing a synchronous data value, here, a count value is provided in the field 27 of the "Transport PDU" field 27. In this example, a size of the field 27a is 4 octets (32 bits). Along with this, the conventional "Transport PDU" field having the maximum of 128 octets is used as a "Transport PDU" field 27b having the maximum of 124 octets. Each node ND stores the synchronous data value in the field 27a during the transmission operation, and acquires the synchronous data value stored in the field 27a during the reception operation.

[Synchronization Method (1) Using Count Value]

FIG. 10 is a timing chart illustrating an operation example of a synchronization method using a count value in the wireless communication system according to the first embodiment. In this example, all nodes ND1 to ND3 start from a state before start of synchronization. At Step S301, the node ND1 transmits a packet in which a synchronous data value (count value) "101" is stored. The nodes ND2 and ND3 that have received the packet from the node ND1 synchronize with the node ND1 by updating a count value of their own nodes with the synchronization data value "101" stored in the packet.

Then, when a certain period of time elapses, an error may occur in the count values of the nodes ND1 to ND3. At Step S302, in a state where this error occurs, the node ND3 transmits a packet in which a synchronous data value "507" stored. The node ND2 that has received the packet from the node ND3 synchronizes with the node ND3 by updating the count value of its own node, which is "506" as it is, with the synchronous data value "507" stored in the received packet. Similarly, the node ND1 that has received the packet from the node ND3 synchronizes with the node ND3 by updating the count value of its own node, which is "508" as it is, with the synchronous data value "507" stored in the received packet.

Note that the synchronous controller 20 of each of the nodes ND1 to ND3 may determine the synchronous data value stored in the packet to be transmitted by using a difference value from a reference count value defined in advance instead of the count value itself. As a specific example, the synchronous controller 20 may set a count value of m/2 as the reference count value in FIG. 6, and determine a difference value from this reference count value as the synchronous data value, for example. As a result, it becomes possible to narrow a possible range of the synchronous data value to about a half thereof, and this makes it possible to reduce the size of the field 27a illustrated in FIG. 9.

[Details of Synchronous Data Value]

Figure 11A:
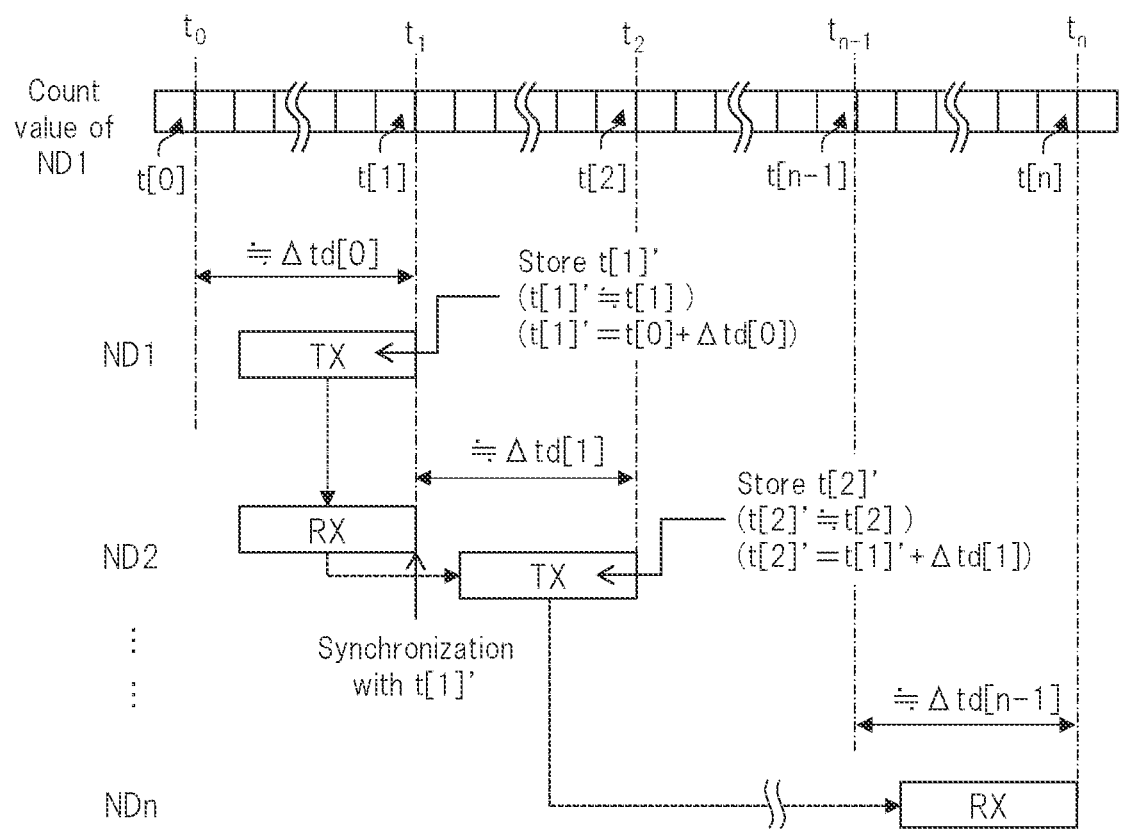
FIG. 11A is a timing chart for explaining one example of a processing method associated with a synchronous data value in the wireless communication system according to the first embodiment.
Figure 11B:
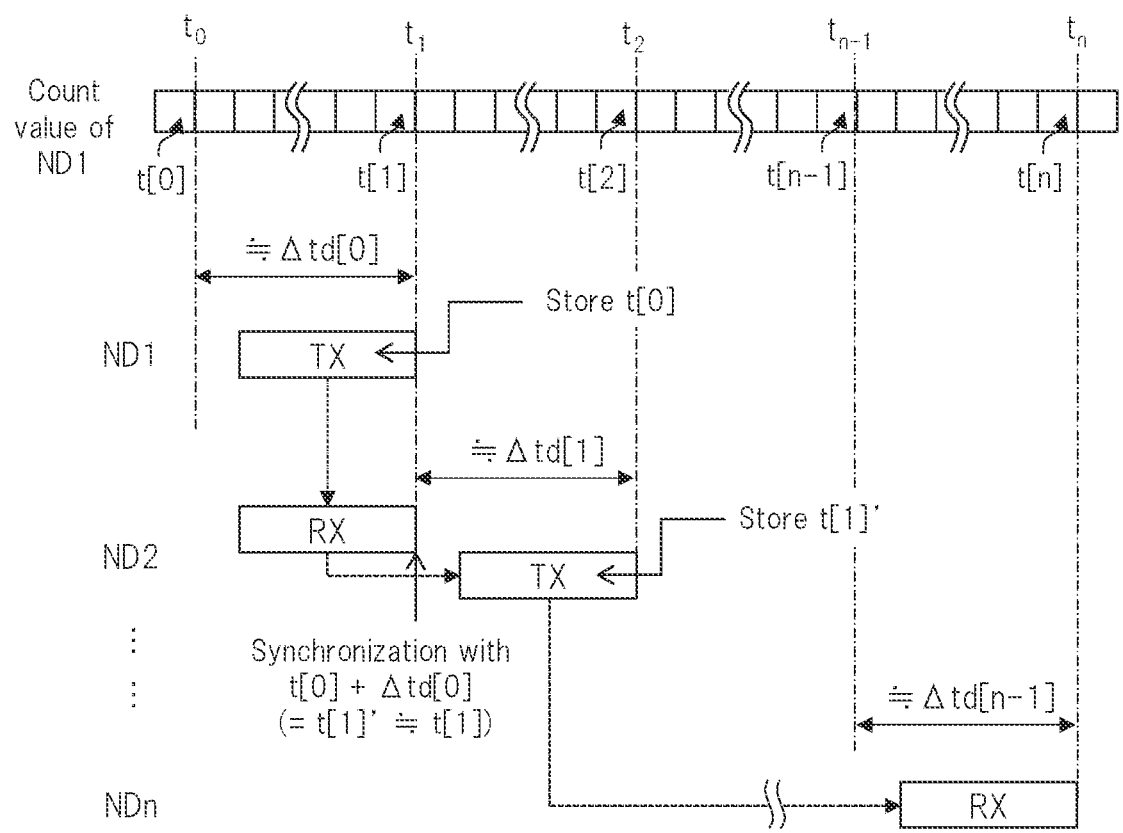
FIG. 11B is a timing chart for explaining one embodiment of a processing method different from that of FIG. 11A.

As described in FIG. 3, the synchronous data value may be a count value to which a predicted delay time is not reflected, and preferably may be a count value to which the predicted delay time is reflected. Here, a case where a count value to which a predicted delay time is reflected will be described in detail. FIG. 11A is a timing chart for explaining one embodiment of a processing method associated with a synchronous data value in the wireless communication system according to the first embodiment. FIG. 11B is a timing chart for explaining one embodiment of a processing method different from that of FIG. 11A.

In FIG. 11A, synchronization is established based on a count value of a node ND1 operating as an initiator INI. First, the node ND1 stores a synchronous data value $t[1]'$ determined by reflecting a predicted delay time $\Delta td[0]$ required for a transmission process of a packet in its own node in a packet (TX) to be transmitted, and transmits it to the latter stage.

Specifically, the node ND1 determines the synchronous data value $t[1]'$ to which the predicted delay time $\Delta td[0]$ is reflected by adding the predicted delay time $\Delta td[0]$ to the packet, specifically, a count value $t[0]$ of its own node at a time to at which the field 27a of FIG. 9 is prepared. The predicted delay time $\Delta td[0]$ is a time from the time $t_0$ at which the packet is prepared to a time $t_1$ at which the transmission of the packet is completed, for example. As a result, the synchronization data value $t[1]'$, that is, the count value is substantially equal to the count value $t[1]$ at the time $t_1$.

A node ND2 operating as a relay RLY completes reception of a packet (RX) at the time to when the node ND1 completes the transmission of the packet (TX). Then, the node ND2 updates a count value of its own node by the synchronization data value $t[1]'$ stored in the received packet. (RX) at the time $t_1$. As a result, the count value $t[1]'$ of the node ND2 is synchronized with the count value $t[1]$ of the node ND1.

Then, the node ND2 determines a synchronization data value $t[2]'$ by reflecting a predicted delay time $\Delta td[1]$ required for transmission processing of a packet in its own node to the updated count value $t[1]'$. Specifically, the node ND2 determines the synchronous data value $t[2]'$ by adding the predicted delay time $\Delta td[1]$ to the updated count value $t[1]$. The predicted delay time $\Delta td[1]$ is a time from the time $t_1$ when the reception of the packet is completed to the time $t_2$ when the transmission of the received packet, that is, the relay is completed. As a result, the synchronous data value $t[2]$, that is, the count value is substantially equal to a count value $t[2]$ at the time $t_2$.

Then, the node ND2 stores the determined synchronous data value $t[2]$ in a packet (TX) to be transmitted, and transmits it to the latter stage.

By sequentially relaying the packet in the similar manner thereafter, for example, a count value of a node (for example, ND3) that has received the packet from the node ND2 is synchronized with the count value of the node ND2 and eventually the count value of the node ND1. Finally, a count value of a node NDn operating a target TGT is also synchronized with the count values of all the former nodes ND. As a result, it is possible to realize highly accurate synchronization of reflecting a delay time required for a transmission process.

In FIG. 11B, as well as the case of FIG. 11A, synchronization is established based on a count value of a node ND1 operating as an initiator INI. However, in FIG. 11B, unlike the case of FIG. 11A, a predicted delay time is reflected not during a transmission operation but during a reception operation. Hereinafter, the description will be given focusing on a difference from FIG. 11A.

First, unlike the case of FIG. 11A, the node ND1 determines a count value t[0] of its own node at a time to at which a packet is prepared as a synchronous data value, and stores it in a packet (TX) to be transmitted. Then, the node ND1 completes transmission of the packet at a time $t_1$ as well as the case of FIG. 11A. On the other hand, a node ND2 changes the synchronous data value by reflecting a predicted delay time Δtd[0] required for a transmission process of the packet in the transmitting node ND1 to a synchronous data value t[0] stored in the packet (RX) received from the node ND1. Then, the node ND2 updates a count value of its own node by the changed synchronous data value.

Specifically, the node ND2 changes the synchronous data value from the t[0] into t[1]' by adding the predicted delay time Δtd[0] to the synchronous data value t[0] stored in the received packet. (RX). The changed synchronous data value t[1]', that is, the count value is substantially equal to a count value t[1] at the time $t_1$ as well as the case of FIG. 11A. Then, the node ND2 updates the count value of its own node by the changed synchronous data value t[1]'. As a result, a count value t[1]' of the node ND2 is synchronized with the court value t[1] of the node ND1.

Then, the node ND2 stores the changed synchronous data value t[1]' in a packet. (TX) to be transmitted, and transmits it to the latter stage. In the similar manner thereafter, the packet is sequentially relayed toward a node NDn operating as a target TGT. In that case, similarly, by reflecting a predicted delay time by the receiving node ND, it is possible to realize highly accurate synchronization of reflecting a delay time required for a transmission process.

Note that the synchronous controller 20 of each of the nodes ND can determine the predicted delay times Δtd[0] and Δtd[1] illustrated in FIG. 11A and FIG. 11B by various methods. For example, the synchronous controller 20 may set the predicted delay time to a fixed value defined in advance. Specifically, a method of determining a fixed value common to the entire wireless communication system and a method of determining a fixed value unique to each node can be mentioned. A size of the fixed value is determined by simulation or actual measurement, for example. Further, the synchronous controller 20 may set the predicted delay time as a variable value based on a packet length or a variable value based on an operating state of its own node ND. With respect to the former, the synchronous controller 20 may set a variable value that increases by a predetermined proportional coefficient as the packet length becomes longer, for example.

Main Effect of First Embodiment

As described above, in the method according to the first embodiment, the communication control is executed on the basis of the schedule including the sleep period, and a time synchronization mechanism is provided. As a result, it is typically possible to reduce power consumption, and in particular, a beneficial effect can be obtained in a mesh network such as a BT mesh. For example, in the BT mesh illustrated in FIG. 1, it is possible to reduce the power consumption of not only the low power nodes I to M, the power consumption of but also the normal nodes A to H, N, and T and the relay nodes Q, R, and S.

Further, with respect to the time synchronization, for example, instead of a method of realizing time synchronization by providing a single management node that manages the time of the entire network, a method of realizing time synchronization by using normal communication executed among a plurality of nodes is used. For this reason, it is possible to increase the tolerance to failures, and there is no need to newly specify a packet dedicated to synchronization used in the management node.

Moreover, since the schedule can be set arbitrarily, it becomes possible to appropriately level the traffics and power consumption generated in the entire network. Specifically, for example, nodes included in the entire network are divided into two segments. It is possible to schedule one segment to be in a sleep period when the other segment is in an active period.

Second Embodiment

<About Communication Valid Period>

Figure 12:
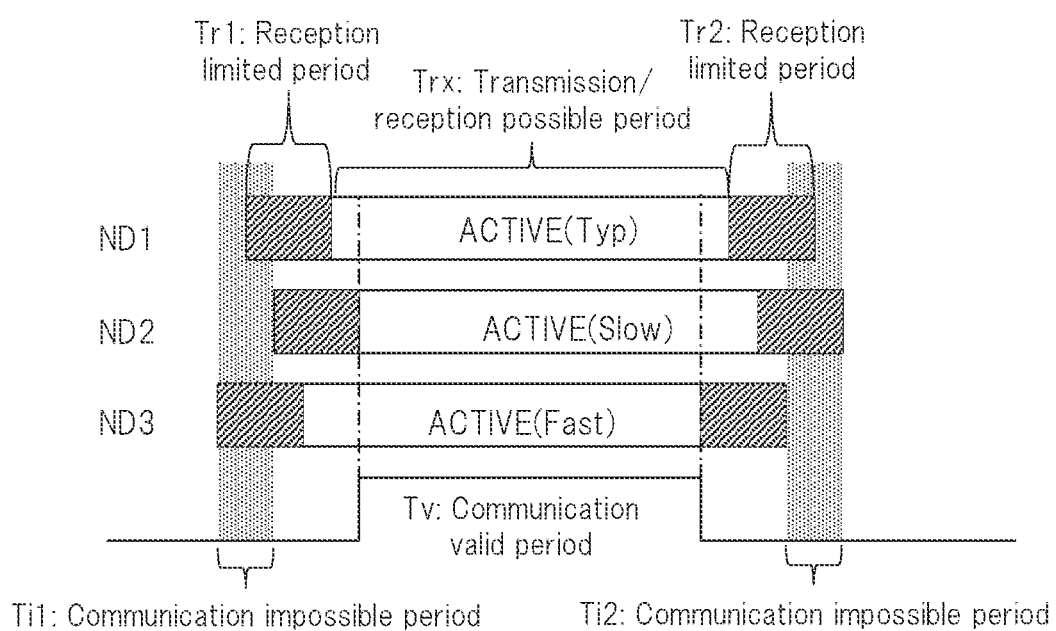
FIG. 12 is a timing chart illustrating one embodiment of an actual communication valid period in a wireless communication system according to a second embodiment.

FIG. 12 is a timing chart illustrating one embodiment of an actual communication valid period in a wireless communication system according to a second embodiment. For example, even in a case where synchronization is established using the communication system as illustrated in FIG. 11A or the like, as illustrated in FIG. 12, deviation may actually occur in times of active periods among respective nodes ND due to an error of a predicted delay time reflected to a synchronous data value, an error of a counter 12, or the like. As a result, there is a period in which some nodes ND, but not all, are active, and this period becomes communication impossible periods Ti1 and Ti2.

On the other hand, in order to avoid unnecessary packet transmission in the communication impossible periods Ti1 and Ti2, it is necessary to provide a margin period in the active period of each of nodes ND1 to ND3 in consideration of the error of the predicted delay time. This margin period is set to reception limited periods Tr1 and Tr2 in which transmission is prohibited and only reception is permitted, for example. A period excluding the reception limited periods Tr1 and Tr2 from the active period is defined as transmission/reception possible period Trx for each of the nodes ND1 to ND3. A communication valid period Tv is a period during which packets can be actually transmitted and received, and is determined by a logical product of the transmission/reception possible periods Trx of the plurality of nodes ND1 to ND3.

The reception limited periods Tr1 and Tr2 are set to a sufficient period for each of the nodes ND1 to ND3 in accordance with a request of the system. However, as a ratio of the reception limited periods Tr1 and Tr2 to the active period increases, communication efficiency decreases to become inefficient from the viewpoint of power consumption. For this reason, is desired to shorten the reception limited periods Tr1 and Tr2 to extend the communication valid period Tv.

<Method of Extending Communication Valid Period>

Figure 13:
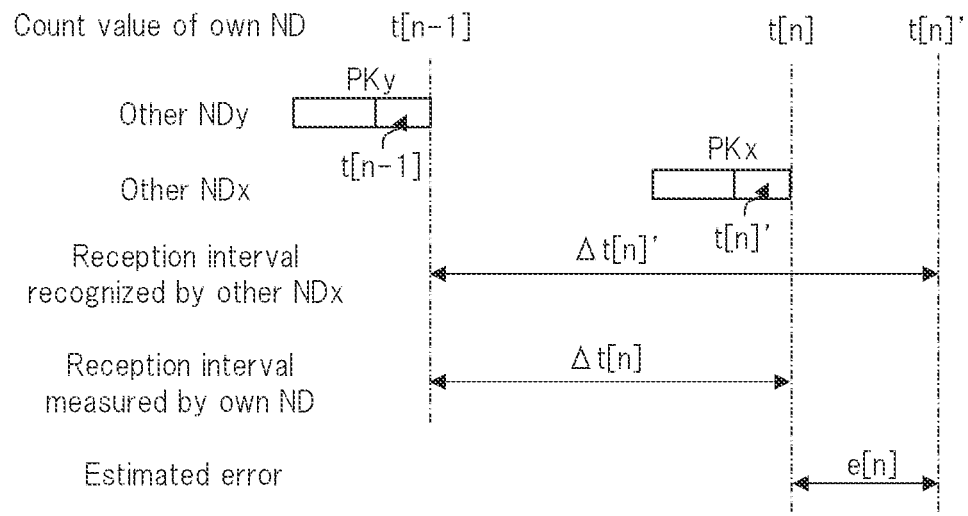
FIG. 13 is a timing chart for explaining one embodiment of a method of extending a communication valid period in the wireless communication system according to the second embodiment.
Figure 14:
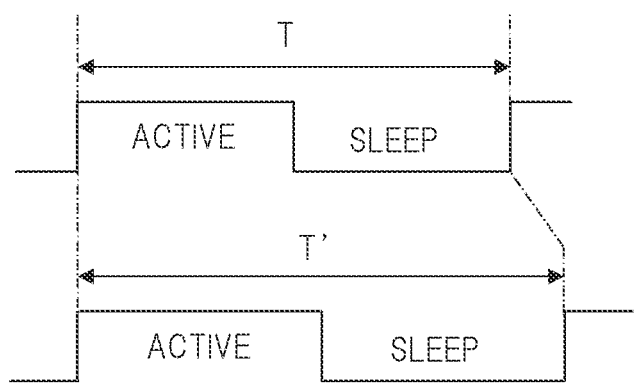
FIG. 14 is a timing chart for explaining another embodiment of a method of extending a communication valid period in the wireless communication system according to the second embodiment.

FIG. 13 and FIG. 14 are timing charts for explaining one embodiment of a method of extending a communication valid period in the wireless communication system according to the second embodiment. Generally, the synchronous controller 20 illustrated in FIG. 4 measures a reception interval Δt [n] on the basis of a count value t[n−1] at the time when a packet PKy in a previous active period and a count value t[n] at the time when a packet PKx is received in a current active period. Further, the synchronous controller 20 calculates a reception interval Δt[n]' recognized by other node NDx that transmits the packet PKx on the basis of the count value t[n−1] and a synchronous data value t[n]' stored in the packet PKx.

Then, the synchronous controller 20 corrects schedule data 21 so as to cause an error between the reception interval Δt[n] based on measurement of its own node ND and the reception interval Δt[n]' of recognition of the other node NDx to approach zero. This makes it possible to reduce the error in the actual schedule among the plurality of nodes ND. As a result, it possible to set the reception limited periods Tr1 and Tr2 to be short, and it becomes possible to extend the communication valid period Tv.

Specifically, in FIG. 13, the time of its own node ND when the packet PKx is received from the other node NDx is t[n], and the time of its own node ND when the packet PKy is received from the other node NDy is t[n−1]. The other node NDy and the other node NDx may be the same node, Note that the time of its own node ND is equivalent to the count value of its own node.

A synchronous data value (or a count value) stored in the packet PKx is t[n]. An interval from the time t[n−1] when its own node ND receives the packet PKy to the time t[n] when it receives the packet PKx is Δt[n]. The interval Δt[n], becomes a reception interval actually measured by its own node ND. An interval from the time t [n−1] when the packet PKy is received to a time t[n] indicated by the synchronous data value stored in the packet PKx is Δt[n]. The interval Δt[t]' means the reception interval recognized by the other node NDx.

Further, as shown in Formula (1), a difference value between the reception interval Δt[n]' based on recognition of the other node NDx and the reception interval Δt[n] based on measurement of its own node is an error e[n]. As shown in Formula (2), a ratio of the error e[n] to the reception interval Δt[n] based on the measurement of its own node is an error ratio e[n]'. Then, as shown in Formula (3), the synchronous controller 20 calculates the error ratio e[n]' each time a packet is received, and calculates an average error value E[n] of the error ratio e[n]' for the past M times.

$$e[n] = \Delta t[n]' - \Delta t[n] \quad (1)$$

$$e[n]' = \frac{e[n]}{\Delta t[n]} \quad (2)$$

$$E[n] = \frac{\sum_{n=N-M+1}^{N} e[n]'}{M} \quad (3)$$

Here, as illustrated in FIG. 14, assuming that one cycle of an active period and a sleep period is T, it can be estimated that an error obtained by multiplying the cycle T by an average error value E[n] occurs, on average, in the cycle T based on a count value of its own node ND as compared with the other nodes. Therefore, as shown in Formula (4), the synchronous controller 20 calculates a cycle T' after correction by correcting the cycle T so as to cancel this estimated error T×E[n].

$$T' = T + TE[n] \quad (4)$$

Then, the synchronous controller 20 corrects schedule data 21 on the basis of this cycle T' after correction. For example, the synchronous controller 20 may distribute the estimated error T×E[n] proportionally to the active period and the sleep period. Note that an algorithm for estimating the error is not limited to the moving average, and various approaches by digital signal processing can be applied.

Main Effect of Second Embodiment

As described above, by using the method according to the second embodiment, it is possible to extend the communication valid period. As a result, it becomes Possible to realize further reduction of power consumption and the like in addition to the various effects described in the first embodiment.

As described above, the invention made by inventors of the present application has been described specifically on the basis of the embodiments. However, the present invention is not limited to the embodiments described above, and it goes without saying that the present invention may be modified into various forms without departing from the substance thereof. For example, the embodiments described above have been explained in detail for explaining the present invention clearly. The present invention is not necessarily limited to one that includes all configurations that have been explained. Further, a part of the configuration of one embodiment can be replaced by a configuration of the other embodiment. Further, a configuration of the other embodiment can be added to a configuration of one embodiment. Further, a part of the configuration of each of the embodiments can be added to the other configuration, deleted, or replaced thereby.

What is claimed is:

1. A wireless communication device comprising:
an oscillator configured to generate a clock signal;
a counter configured to sequentially update a count value in accordance with the clock signal;
a memory configured to hold schedule data that define an active period and an inactive period, the active period being expressed by a range of the count value and being a period during which communication of a packet with an outside is permitted, the inactive period being expressed by a range of the count value and being a period during which communication of a packet with an outside is prohibited;
a wireless communication interface configured to communicate a packet with the outside during the active period obtained from the schedule data and the count value of the counter;
a power supply controller configured to cut off power supplied to the wireless communication interface during the inactive period obtained from the schedule data and the count value of the counter;
a synchronous controller configured to update the count value of the counter on a basis of a synchronous data value stored in a received packet during a reception operation of receiving the packet from the outside, define the synchronous data value on a basis of the updated count value during a transmission operation of transmitting a packet to the outside, and store the defined synchronous data value in the packet to be transmitted.

2. The wireless communication device according to claim 1,
wherein the synchronous controller is further configured to update the count value of the counter by the synchronous data value stored in the received packet during the reception operation, define the synchronous data value by reflecting a predicted delay time required for a transmission process of a packet in an own device to the updated count value during the transmission operation, and store the defined synchronous data value in the packet to be transmitted.

3. The wireless communication device according to claim 2,
wherein, in a case where the synchronous controller operates as an initiator for transmitting a packet generated by the own device to an outside, the synchronous controller is further configured to store the synchronous data value defined by reflecting the predicted delay time required for the transmission process of the packet in the own device in the packet to be transmitted.

4. The wireless communication device according to claim 1,
wherein the synchronous controller is further configured to change the synchronous data value by reflecting a predicted delay time required for a transmission process of a packet in a transmitting device to the synchronous data value stored in the received packet during the reception operation, update the count value of the counter by the changed synchronous data value, and store the changed synchronous data value in the packet to be transmitted during the transmission operation.

5. The wireless communication device according to claim 4,
wherein, in a case where the synchronous controller operates as an initiator for transmitting a packet generated by the own device to an outside, the synchronous controller is further configured to define the count value of the counter at a time when the packet is prepared as the synchronous data value, and store the synchronous data value in the packet to be transmitted.

6. The wireless communication device according to claim 2,
wherein the synchronous controller is further configured to define the predicted delay time as a fixed value defined in advance.

7. The wireless communication device according to claim 2,
wherein the synchronous controller is further configured to define the predicted delay time as a variable value based on a packet length.

8. The wireless communication device according to claim 1,
wherein the synchronous controller is further configured to:
measure a first reception interval on a basis of a first count value at a time when a first packet is received during a previous active period and a second count value at a time when a second packet is received during a current active period;
calculate a second reception interval recognized by another device, which transmitted the second packet, on a basis of the first count value and the synchronous data value stored in the second packet; and
correct the schedule data so that an error between the first reception interval and the second reception interval approaches zero.

9. The wireless communication device according to claim 1,
wherein the synchronous controller is further configured to define the synchronous data value to be stored in the packet to be transmitted by using a difference value from a reference count value defined in advance.

10. The wireless communication device according to claim 1,
wherein the wireless communication device is a device compatible with "Bluetooth mesh" standards.

11. A wireless communication system comprising a plurality of wireless communication devices,
wherein each of the plurality of wireless communication devices comprises:
an oscillator configured to generate a clock signal;
a counter configured to sequentially update a count value in accordance with the clock signal;
a memory configured to hold schedule data that define an active period and an inactive period, the active period being expressed by a range of the count value and being a period during which communication of a packet with any of the other wireless communication devices is permitted, the inactive period being expressed by a range of the count value and being a period during which communication of a packet with any of the other wireless communication devices is prohibited;
a wireless communication interface configured to communicate a packet with any of the other wireless communication devices during the active period obtained from the schedule data and the count value of the counter;
a power supply controller configured to cut off power supplied to the wireless communication interface during the inactive period obtained from the schedule data and the count value of the counter;
a synchronous controller configured to update the count value of the counter on a basis of a synchronous data value stored in a received packet during a reception operation of receiving the packet from any of the other wireless communication devices, define the synchronous data value on a basis of the updated count value during a transmission operation of transmitting a packet to the other wireless communication device, and store the defined synchronous data value in the packet to be transmitted.

12. The wireless communication system according to claim 11,
wherein the synchronous controller is further configured to update the count value of the counter by the synchronous data value stored in the received packet during the reception operation, define the synchronous data value by reflecting a predicted delay time required for a transmission process of a packet in an own device to the updated count value during the transmission operation, and store the defined synchronous data value in the packet to be transmitted.

13. The wireless communication system according to claim 12,
wherein, in a case where the synchronous controller operates as an initiator for transmitting a packet generated by the own device to an outside, the synchronous controller is further configured to store the synchronous data value defined by reflecting the predicted delay time required for the transmission process of the packet in the own device in the packet to be transmitted.

14. The wireless communication system according to claim 11,
wherein the synchronous controller is further configured to change the synchronous data value by reflecting a predicted delay time required for a transmission process of a packet in a wireless communication device at a transmission side to the synchronous data value stored in the received packet during the reception operation, update the count value of the counter by the changed synchronous data value, and store the changed synchronous data value in the packet to be transmitted during the transmission operation.

15. The wireless communication system according to claim 11, wherein, in a case where the synchronous controller operates as an initiator for transmitting a packet generated by the own device to an outside, the synchronous controller is further configured to define the count value of the counter at a time when the packet is prepared as the synchronous data value, and store the synchronous data value in the packet to be transmitted.

16. The wireless communication system according to claim 12, wherein the synchronous controller is further configured to define the predicted delay time as a fixed value defined in advance.

17. The wireless communication system according to claim 12, wherein the synchronous controller is further configured to define the predicted delay time as a variable value based on a packet length.

18. The wireless communication system according to claim 11, wherein the synchronous controller is further configured to:

measure a first reception interval on a basis of a first count value at a time when a first packet is received during a previous active period and a second count value at a time when a second packet is received during a current active period;

calculate a second reception interval recognized by a wireless communication device, which transmitted the second packet, on a basis of the first count value and the synchronous data value stored in the second packet; and correct the schedule data so that an error between the first reception interval and the second reception interval approaches zero.

19. The wireless communication system according to claim 11, wherein the synchronous controller is further configured to define the synchronous data value to be stored in the packet to be transmitted by using a difference value from a reference count value defined in advance.

20. The wireless communication system according to claim 11, wherein the wireless communication device is a device compatible with "Bluetooth mesh" standards.

* * * * *